US007182800B2

(12) United States Patent
Uhl et al.

(10) Patent No.: US 7,182,800 B2
(45) Date of Patent: Feb. 27, 2007

(54) MANUALLY OPERATED TOOL

(75) Inventors: Klaus-Martin Uhl, Baltmannsweiler (DE); Sebastian Friedrich, Waiblingen (DE)

(73) Assignee: Andreas Stihl AG & Co., KG, Waiblingen (DE)

( * ) Notice: Subject to any disclaimer, the term of this patent is extended or adjusted under 35 U.S.C. 154(b) by 207 days.

(21) Appl. No.: 10/850,282

(22) Filed: May 20, 2004

(65) Prior Publication Data

US 2004/0261754 A1 Dec. 30, 2004

(30) Foreign Application Priority Data

May 20, 2003 (DE) ................................ 103 22 640

(51) Int. Cl.
*B01D 35/30* (2006.01)
*F02M 35/04* (2006.01)

(52) U.S. Cl. ...................... 55/346; 55/385.1; 55/385.3; 55/459.1; 123/198 E

(58) Field of Classification Search ............... 55/385.1, 55/385.3, 459.1, 346; 123/198 E
See application file for complete search history.

(56) References Cited

U.S. PATENT DOCUMENTS

| | | | | |
|---|---|---|---|---|
| 3,262,433 | A * | 7/1966 | Jordan | 123/73 A |
| 3,521,434 | A * | 7/1970 | Heinz | 56/12.8 |
| 3,542,095 | A | 11/1970 | Frederickson et al. | |
| 5,197,426 | A * | 3/1993 | Frangesch et al. | 123/198 E |
| 5,676,115 | A | 10/1997 | Linsbauer et al. | |

* cited by examiner

*Primary Examiner*—Robert A. Hopkins
(74) *Attorney, Agent, or Firm*—Robert W Becker & Associates; Robert W Becker

(57) ABSTRACT

A manually operated implement such as a chainsaw, parting-off grinder or similar device is provided and has an internal combustion engine to drive a tool, an air cleaning unit and a tank housing. The tank housing is a cast part and a fuel tank is located in the tank housing. A simple, advantageous design of the tank housing is achieved when at least one housing part of the air cleaning unit is formed on the tank housing.

20 Claims, 4 Drawing Sheets

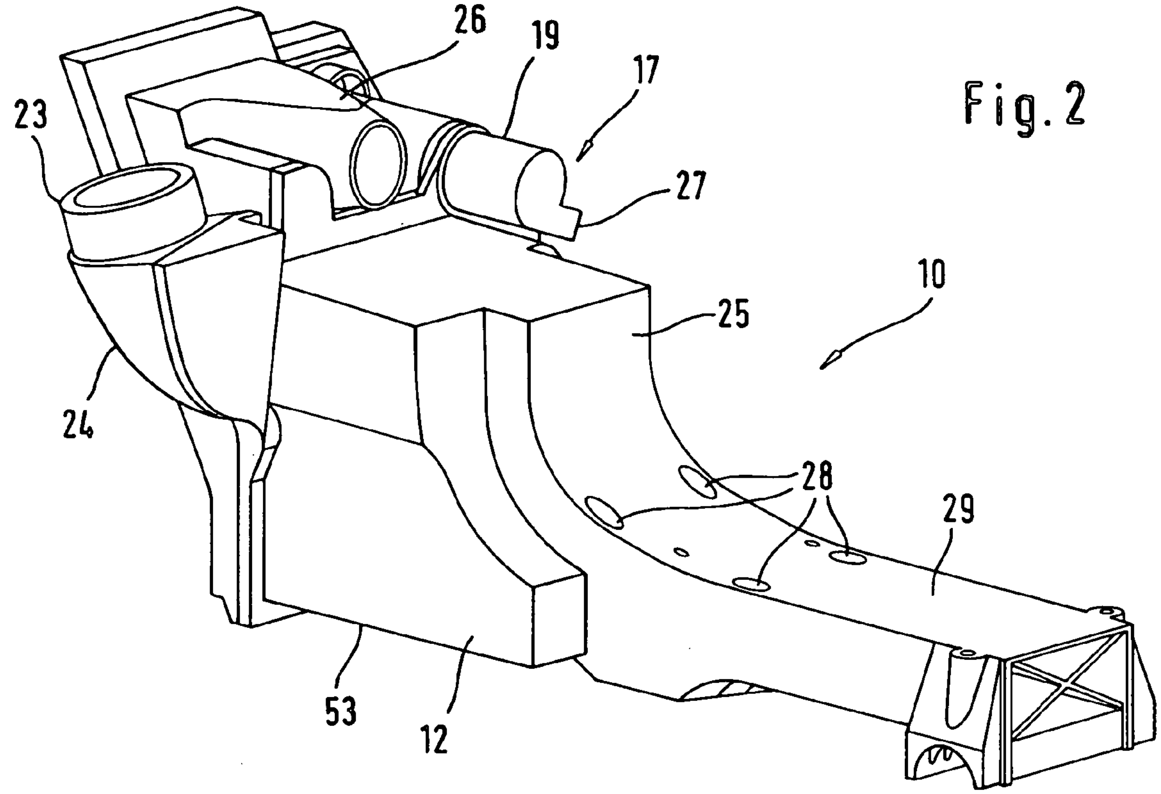
Fig. 2
Fig. 3
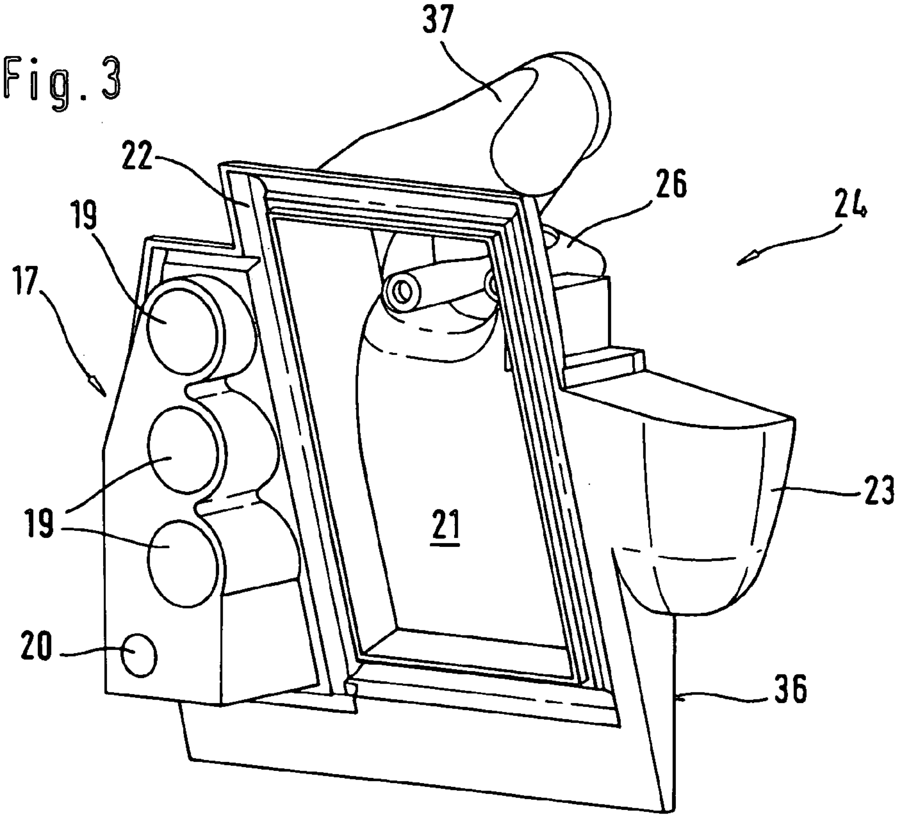

MANUALLY OPERATED TOOL

BACKGROUND OF THE INVENTION

The invention relates to a manually operated tool such as a chain saw, parting-off grinder or similar device.

A parting-off grinder having a tank housing which comprises a fuel tank and an equalizing reservoir is known from DE 44 27 738 A1. An air filter is provided as an air cleaning unit. The fuel tank itself forms one housing wall of the parting-off grinder. The air filter is positioned in the housing.

The object of the invention is to create a tool of the aforementioned general type which is of simple design.

This object is achieved by means of a tool or implement having an internal combustion engine for driving a tool, and comprising an air cleaning unit and a tank housing, wherein the tank housing is a cast part, wherein a fuel tank is formed in the tank housing, and wherein at least one housing part of the air cleaning unit is formed on the tank housing.

The forming of a housing part of the air cleaning unit on the tank housing permits the number of individual parts in the tool to be reduced. At the same time the total weight of the tool can be considerably reduced thanks to the savings in material. This also simplifies the operation of the tool.

The air cleaning unit advantageously comprises a cyclone unit with at least one cyclone tube, part of which at least is designed as one piece with the tank housing. In this arrangement the cyclone tube advantageously lies along the longitudinal axis of the tool and passes at least partially through the tank housing. The arrangement of the cyclone tubes along the tool results in a compact design of tank housing and air cleaning unit. The air cleaning unit advantageously comprises an air filter unit with a housing which is designed at least partially as one piece with the tank housing. In this arrangement the air filter base of the air filter unit is formed onto the tank housing. This obviates the need for an additional housing wall between the air filter and the tank housing. At the same time, the size can be reduced as spaces between the components are rendered redundant due to the one-piece design.

The tank housing expediently comprises two molded shells which are connected to one another in a parting plane at right angles to the longitudinal axis of the tool. The division of the tank housing at right angles to the longitudinal axis of the tool, in particular perpendicular to the longitudinal axis of the tool, means that the connecting seam between the two molded shells is shorter than if it were divided along the longitudinal axis of the tool. This ensures adequate strength even with the thin tank housing wall thicknesses required to achieve a low weight. By dividing the tank housing at right angles it is possible to integrate the cyclone tubes and the air filter base simply without the need for cores for the manufacture of the tank housing in a casting process. The two molded shells are expediently connected together by means of welding.

Provision is made for the integration of an equalizing reservoir into the tank housing. The equalizing reservoir equalizes the volume in the tank. The equalizing reservoir is connected to the fuel tank via an equalizing line which runs particularly in the parting plane of the two molded shells. The arrangement of the equalizing line in the parting plane makes for a simple manufacturing process, the equalizing line particularly being integrated in the two molded shells and thus manufactured in one piece with them. If the two molded shells of the tank housing are connected by means of ultrasound welding, the equalizing line can also be welded at the same time. In this arrangement small leaks in the equalizing line are insignificant in terms of the leakproofness of the overall system since the equalizing line runs entirely within the tank housing and fuel is therefore only able to leak into the fuel tank or the equalizing reservoir. A throttle for regulating the flow cross-section in the equalizing line is advantageously positioned in the equalizing line. The throttle is advantageously accessible from the tank connector and can therefore be adjusted simply. The throttle is expediently a grub screw or setscrew.

A bleed line is run from the equalizing reservoir to a bleed or venting opening. The bleed line is expediently integrated into the molded shells and advantageously also runs inside the tank housing such that the bleed line can be manufactured together with the molded shells and welded to them in one work cycle. A bleed valve is advantageously positioned in the bleed opening. The bleed opening is particularly positioned in the air filter base so that air and any fuel being carried with it is able to pass out of the equalizing reservoir directly to the clean side of the air filter and from there into the intake duct. This prevents any fuel from escaping. At the same time, the fuel carried away via the bleed line is fed to the internal combustion engine. The forming of the air filter base onto the tank housing avoids the need for sealing points on the outside of the tank housing and ensures that even if the bleed valve is not completely sealed it is impossible for fuel to leak out.

The tank housing is advantageously a load-bearing housing part of the tool. This obviates the need for further components which might otherwise form a load-bearing structure. The tank housing is particularly made of plastic.

Embodiments of the invention are explained below with reference to the drawing, in which:

FIG. 2 shows a perspective view of the tank housing;

Figure 5:
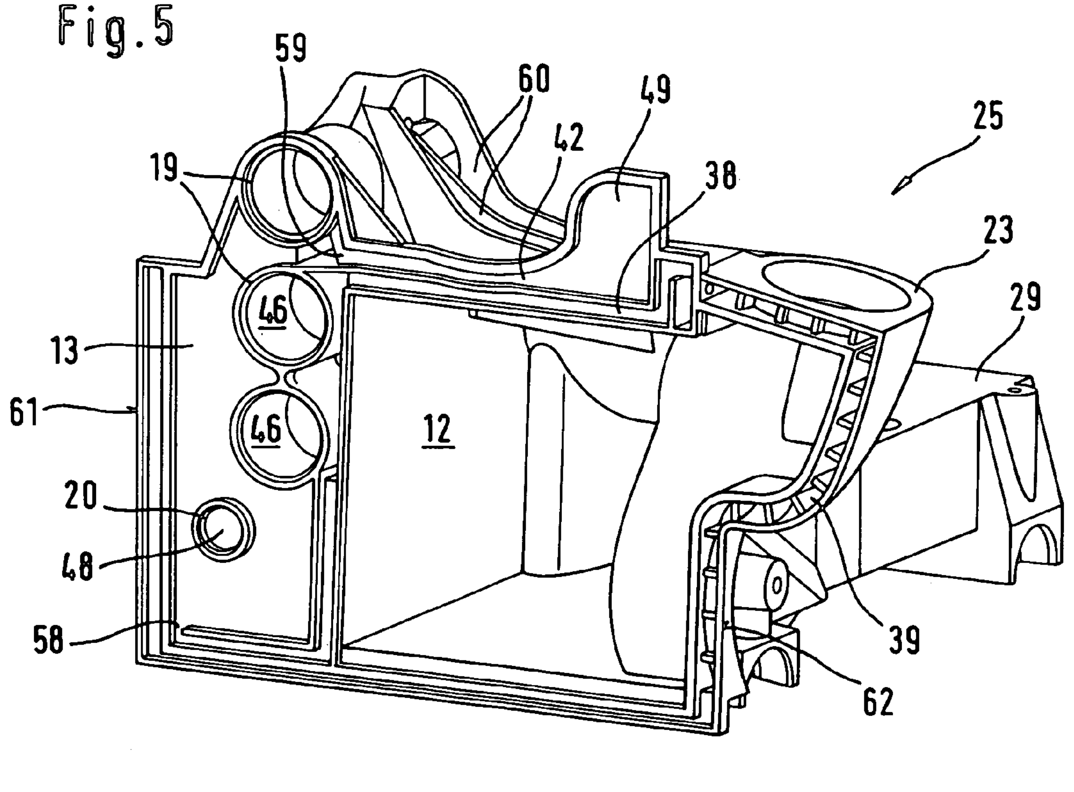
Figure 7:
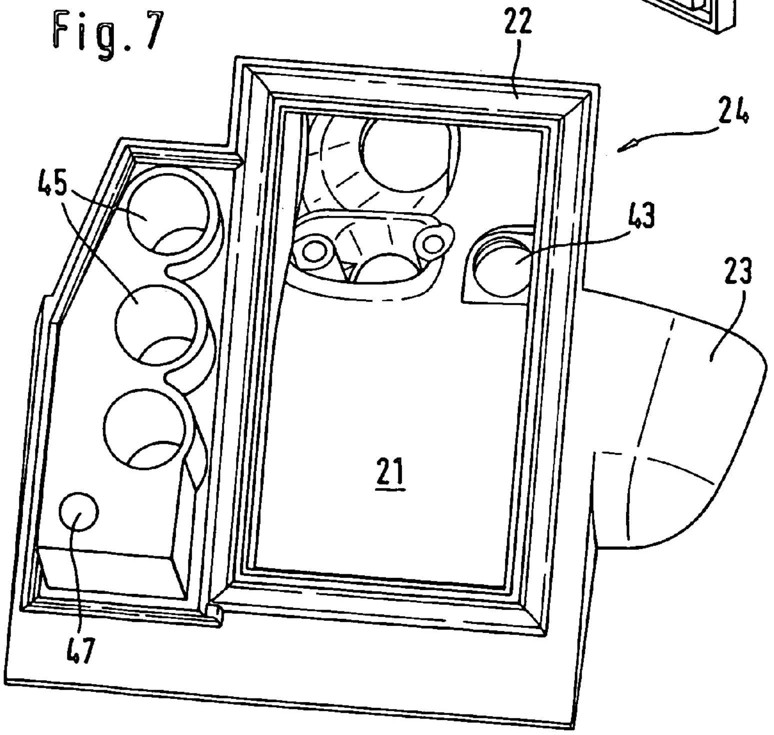
Figure 8:
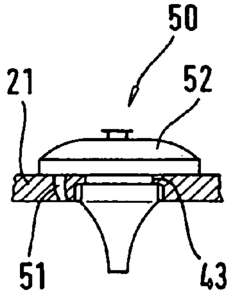

FIGS. 3/4 show perspective views of a first molded shell of the tank housing;

FIGS. 5/6 show perspective views of a second molded shell of the tank housing;

FIG. 7 shows a perspective view of the first molded shell of the tank housing; and FIG. 8 shows a section of a bleed valve.

Figure 1:
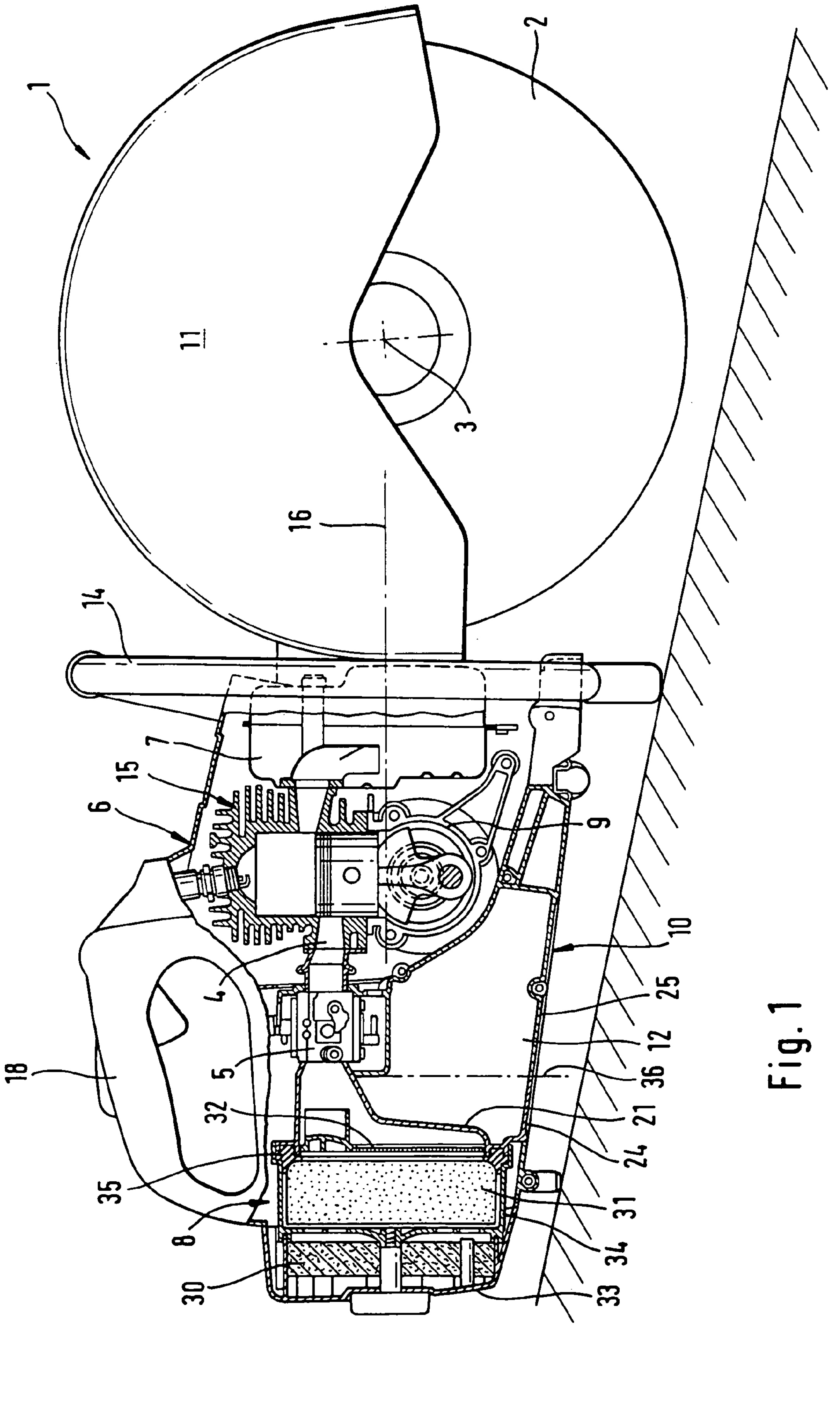
FIG. 1 shows a side view of a partial section of a parting-off grinder.

FIG. 1 shows a manually operated tool, namely a cut-off machine or parting-off grinder 1 with a parting-off wheel 2, which is driven so that it rotates about an axis 3. The parting-off wheel 2 is partially surrounded by a protective hood 11. The parting-off wheel 2 is driven by a two-stroke engine 15 via a belt drive (not illustrated). Instead of a two-stroke engine it is also possible to provide another internal combustion engine, for example a four-stroke engine. The two-stroke engine 15 is positioned in a housing 6 above a tank housing 10. In this arrangement the crankcase 9 of the two-stroke engine 15 is screwed onto the tank housing 10. An exhaust muffler 7 is positioned at the outlet from the two-stroke engine. Fuel/air mixture prepared in a carburettor 5 is fed to the two-stroke engine 15 via the intake duct 4. The combustion air is prepared in an air cleaning unit. An upper handle 18 which runs approximately along the longitudinal axis 16 of the parting-off grinder 1 and a grip tube 14 which extends in a plane approximately perpendicular to the longitudinal axis 16 of the tool between the housing 6 and the parting-off wheel 1 are provided to operate the tool. The longitudinal axis 16 of the tool runs in the plane of the parting-off wheel 2 perpendicular to the axis 3 approximately in the direction of the intake duct 4 and at the same time characterises the longest part of the parting-off grinder 1.

The air cleaning unit comprises an air filter unit 8 with a pre-filter 30 which is positioned in a cover 33, a main filter 31 in an air filter housing 34 and a fine filter 32 which is positioned between the main filter and the air filter base 21. Instead of the pre-filter 30 it is also possible to provide a cyclone unit. A peripheral seal 35 is held between the air filter housing 34 and the air filter base 21. The air filter base 21 is formed onto the tank housing 10. The tank housing 10 and the clean side of the air filter unit 8 are thus separated only by the air filter base 21.

The tank housing 10 is formed of a first molded or partial shell 24 and a second molded or partial shell 25. The parting plane 36 between the two molded shells 24, 25 runs in a plane perpendicular to the longitudinal axis 16 of the tool. Located in the tank housing 10 is a fuel tank 12 which is bounded partially by the first and partially by the second molded shell.

FIG. 2 shows a perspective view of the tank housing 10. Formed onto the first molded shell 24 facing away from the parting-off wheel 2 when installed is the tank connector 23. Moreover a connector 26 is formed onto the air filter base 21 in an extension thereof towards the carburettor 5. The intake duct 4 passes through the connector 26. A part of the air cleaning unit is formed by a cyclone unit 17 which comprises individual cyclone tubes 19. The cyclone tubes 19 run approximately along the longitudinal axis 16 of the parting-off grinder 1 and are formed partially onto the first molded shell 24 and partially onto the second molded shell 25. The inlet 27 into the cyclone tubes 19 runs tangentially to the cyclone tubes 19 and is formed onto the side of the cyclone tubes 19 facing the parting-off wheel 2. The second molded shell 25 has a straight section 29 in the area of the base 53 of the tank housing 10 which forms the extension of the tank housing 10 towards the parting-off wheel 2. Located in the straight section 29 are four holes 28 via which the two-stroke engine 15 can be screwed from the base 53. The holes 28 thereby represent fixing or mounting openings.

FIGS. 3 to 7 show an embodiment of the molded shells 24 and 25, identical components being designated by the same reference numerals used in FIGS. 1 and 2.

FIG. 3 shows the first molded shell 24 from the side of the air filter unit 8. Provided at the air filter base 21 is the peripheral sealing edge 22 to receive the seal 35 shown in FIG. 1. In this arrangement the plane in which the sealing edge 22 runs is inclined in relation to the parting plane 36. Partially formed onto the molded shell 24 is the tank connector 23. The section of the tank connector 23 which surrounds the filling opening is formed onto the second molded shell 25 (FIG. 5). Extending from the air filter base 21 on the first molded shell 24 (FIG. 3) are a connector 26 in which is located the intake duct 4 and a connector 37 in which is located an air duct for the supply of largely fuel-free air to the two-stroke engine 15. The cyclone unit 17 comprises three cyclone tubes 19 and a return 20 through which the dirt separated by the cyclone tubes 19 is delivered to the fan wheel to be discharged from the parting-off grinder 1.

Figure 4:
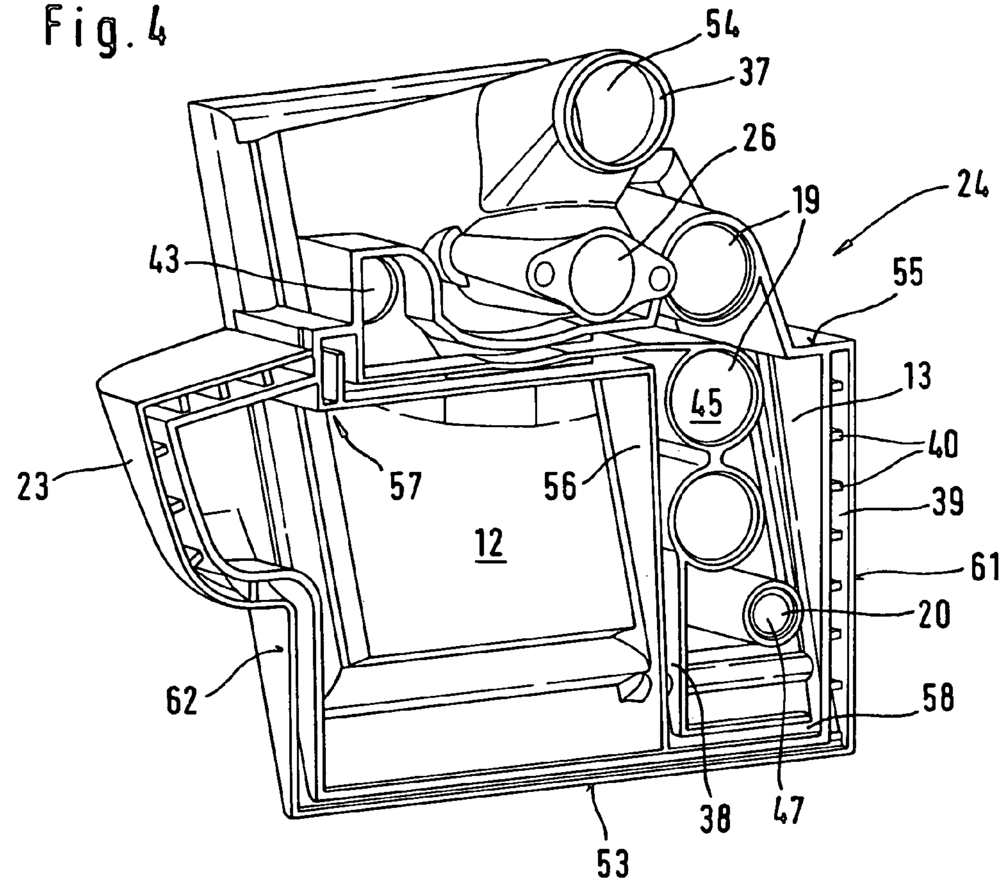

FIG. 4 shows the first molded shell 24 from the side facing the second molded shell 25. The air duct 54 passes through the connector or support 37. The cyclone tubes 19 are located partially in the first molded shell 24 and partially in the second molded shell 25. Thus sections 45 of the cyclone tubes 19 are positioned in the first molded shell 24 and sections 46 are positioned in the second molded shell 25. Similarly, a section 47 of the return 20 is located in the first molded shell 24 while a section 48 is formed in the second molded shell 25. The wall 39 of the tank housing 10 has two walls in the area of the longitudinal sides (61 and 62) and in the area of the base 53. Reinforcing struts 40 extend between the two walls. The double-walled design of the external wall ensures adequate leakproofness of the tank housing 10.

Located in the tank housing 10 are a fuel tank 12 and an equalizing reservoir 13. In this arrangement, the equalizing reservoir extends in the area of the cyclone tubes 19 which pass through the equalizing reservoir 13 of the tank 10. The return 20 also passes through the equalizing reservoir 13. The fuel tank 12 and the equalizing reservoir 13 are separated from one another by a lateral wall 56 which runs approximately along the longitudinal axis 16 of the parting-off grinder 1. The fuel tank 12 and the equalizing reservoir 13 are connected to one another via an equalizing line 38. The equalizing line 38 has an inlet (not illustrated) in the area 57 at the roof 55 of the tank housing 10. The equalizing line 38 passes first towards the roof 55 and then in the opposite direction towards the base 53 thereby forming a labyrinth-like deviation. The equalizing line 38 then runs along the roof 55, the lateral wall 56 and the base 53 until it flows into a outlet 58 in the area of the base 53 of the tank housing 10 in the equalizing reservoir 13. The equalizing line 38 runs in the parting plane 36 of the two molded shells 24 and 25, the equalizing line 38 being formed onto both molded shells 24 and 25. In the area of the lateral wall 56 the equalizing line 38 runs between the fuel tank 12 and the cyclone tubes 19. Pressure can be equalised between the fuel tank and the equalizing reservoir 13 via the equalizing line 38. The labyrinth-like arrangement of the equalizing line 38 largely prevents fuel from entering the equalizing reservoir 13. Nevertheless, should fuel enter the equalizing reservoir 13, it collects in the area of the base 53 in the equalizing reservoir 13 and is returned to the fuel tank 12 during the operation of the parting-off grinder 1.

Positioned in the area of the roof 55 is a bleed line 42 which flows into an inlet 59 in the equalizing reservoir 13 (FIG. 5). The bleed line 42 runs from the inlet 59 to a cover section 49 on the second molded shell 25 covering the bleed opening 43 formed in the first molded shell 24. As shown in FIG. 7, in particular, the bleed opening 43 is positioned in the air filter base 21 and thus connects the clean side of the air cleaning unit to the equalizing reservoir 13 via the bleed line 42.

Figure 6:
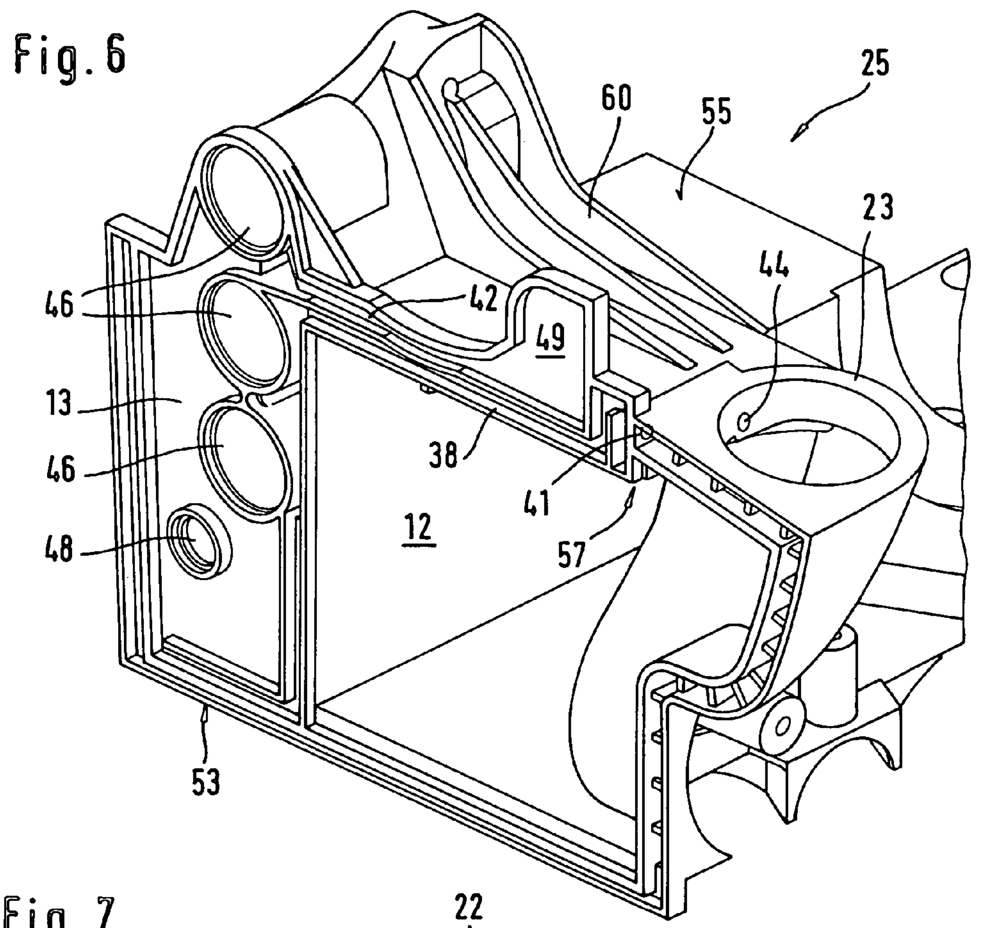

As shown in FIG. 6, there is positioned in the area 57 of the equalizing line 38 in which the equalizing line 38 is connected to the fuel tank 12 a throttle 41. The tank connector 23 has a hole 44 through which the throttle 41, which is in particular designed as a setscrew or grub screw, is accessible. Via the throttle 41 it is possible to adjust the flow cross-section in the equalizing line 38 Reinforcing struts 60 which run at right angles to the longitudinal axis 16 of the parting-off grinder 1 are provided on the second molded shell 25 in the area of the roof 55 of the tank housing 10.

FIG. 8 shows a bleed valve 50 which may be positioned in the bleed opening 43. The valve 50 is designed as a mushroom valve and has a valve member 52 which closes a duct 51 formed in the air filter base 21. When the pressure in the equalizing reservoir 13 increases, the valve member 52 is lifted and air is able to flow out of the equalizing reservoir 13 through the duct 51 onto the clean side of the air cleaning unit. Instead of the bleed valve 50 it is also possible to use an assembly comprising an aeration and a ventilation valve, in particular of a duck beak valve and a mushroom valve. The assembly is in particular positioned inside a special housing.

The fact that the equalizing line 38, the bleed line 42 and the bleed opening 43 are integrated into the tank housing 10 prevents leaks to the outside. The tank housing 10 may be produced simply using a casting process and, where it is made of plastic, particularly using an injection moulding process. In this case, parts of the air cleaning unit and all connecting lines can also be produced in the same work cycle. The two molded shell 24 and 25 are advantageously welded, fused or heat sealed together, if the tank housing 10 is made of plastic in particular by means of ultrasound welding. All the connecting lines are made in one work cycle. To check the leakproofness of the tank housing it is possible to integrate a diagnostics connection for checking tank integrity in the tank connector. A tank housing as disclosed in the invention is particularly useful for use in parting-off grinders but can also advantageously be employed in chainsaws and other manually operated tools.

The specification incorporates by reference the disclosure of German priority document 103 22 640.0 filed May 20, 2003.

The present invention is, of course, in no way restricted to the specific disclosure of the specification and drawings, but also encompasses any modifications within the scope of the appended claims.

We claim:

1. A manually operated implement having an internal combustion engine for driving a tool, said implement comprising:

an air cleaning unit having a housing; and a tank housing, wherein said tank housing is a cast part, wherein a fuel tank is formed in the tank housing, wherein at least one housing part of said air cleaning unit is formed on said tank housing, wherein an equalizing reservoir is integrated into said tank housing.

2. An implement according to claim 1, wherein said air cleaning unit is an air filter unit, the housing of which is at least partially monolithically formed with said tank housing.

3. An implement according to claim 2, wherein said air filter unit has an air filter base that is formed on said tank housing.

4. An implement according to claim 1, wherein said tank housing comprises two partial shells, that are interconnected in a plane of separation that extends transverse to a longitudinal direction of said implement.

5. An implement according to claim 4, wherein said two partial shells are interconnected by fusing.

6. An implement according to claim 1, wherein said equalizing reservoir is in communication with said fuel tank via an equalizing line that extends in said plane of separation of said two partial shells.

7. An implement according to claim 6, wherein said equalizing line is integrated into said two partial shells.

8. An implement according to claim 6, wherein a throttle is disposed in said equalizing line.

9. An implement according to claim 8, wherein said throttle is accessible from a tank connector.

10. An implement according to claim 8, wherein said throttle is a grub screw.

11. An implement according to claim 6, wherein a bleed line is provided and extends from said equalizing reservoir to a bleed opening.

12. An implement according to claim 11, wherein said bleed line is integrated into said partial shells.

13. An implement according to claim 11, wherein a bleed valve is disposed in said bleed opening.

14. An implement according to claim 11, wherein said bleed opening is disposed in an air filter base of said air cleaning unit.

15. An implement according to claim 1, wherein said tank housing is a load-bearing housing part of said implement.

16. An implement according to claim 1, wherein said tank housing is made of plastic.

17. A manually operated implement having an internal combustion engine for driving a tool, said implement comprising:

an air cleaning unit having a housing; and a tank housing, wherein said tank housing is a cast part, wherein a fuel tank is formed in the tank housing, wherein at least one housing part of said air cleaning unit is formed on sand tank housing, and wherein said air cleaning unit includes a cyclone unit having at least one cyclone tube that is at least partially monolithically formed with said tank housing.

18. An implement according to claim 17, wherein said at least one cyclone tube is disposed in a longitudinal direction of said implement and extends at least partially through said tank housing.

19. An implement according to claim 17, wherein said tank housing comprises two partial shells, that are interconnected in a plane of separation that extends transverse to a longitudinal direction of said implement.

20. An implement according to claim 19, wherein an equalizing reservoir is integrated into said tank housing.

* * * * *